United States Patent
Garzoni et al.

(10) Patent No.: US 8,885,030 B2
(45) Date of Patent: Nov. 11, 2014

(54) DEVICE FOR TRACKING PREDETERMINED OBJECTS IN A VIDEO STREAM FOR IMPROVING A SELECTION OF THE PREDETERMINED OBJECTS

(75) Inventors: Marina Garzoni, Milan (IT); Andrey Golub, Milan (IT)

(73) Assignee: Moda E Technologia S.R.L., Milan (IT)

( * ) Notice: Subject to any disclaimer, the term of this patent is extended or adjusted under 35 U.S.C. 154(b) by 316 days.

(21) Appl. No.: 12/985,311

(22) Filed: Jan. 5, 2011

(65) Prior Publication Data
US 2012/0038759 A1    Feb. 16, 2012

(30) Foreign Application Priority Data
Aug. 12, 2010 (IT) .............. MI2010A1545

(51) Int. Cl.
*H04N 9/47* (2006.01)
*G06F 17/30* (2006.01)
*G06Q 30/06* (2012.01)

(52) U.S. Cl.
CPC .... *G06F 17/30781* (2013.01); *G06F 17/30259* (2013.01); *G06Q 30/06* (2013.01); *G06Q 30/0603* (2013.01)
USPC .......................................................... 348/61

(58) Field of Classification Search
CPC ................................................. G06F 17/30259
USPC .......................................................... 348/61
See application file for complete search history.

(56) References Cited

U.S. PATENT DOCUMENTS

| | | | | |
|---|---|---|---|---|
| 5,915,972 A | * | 6/1999 | Tada | 434/307 A |
| 6,233,389 B1 | * | 5/2001 | Barton et al. | 386/232 |
| 6,738,356 B1 | * | 5/2004 | Russell et al. | 370/260 |
| 2002/0097322 A1 | * | 7/2002 | Monroe et al. | 348/159 |
| 2009/0006937 A1 | * | 1/2009 | Knapp et al. | 715/205 |

* cited by examiner

Primary Examiner — Dave Czekaj
Assistant Examiner — Leron Beck
(74) Attorney, Agent, or Firm — Steinfl & Bruno, LLP

(57) ABSTRACT

A device for tracking objects in a video is described. The device has a processing unit. The processing unit has a selection module configured for selecting video portions, a tracking module for tracking positions of predetermined objects in the video portions, a stream generation module for creating a predetermined object's video streams, and a composition module configured for composing partial video streams of individual predetermined objects into an output video stream. The device also has a transmission system for tracking predetermined objects.

16 Claims, 2 Drawing Sheets

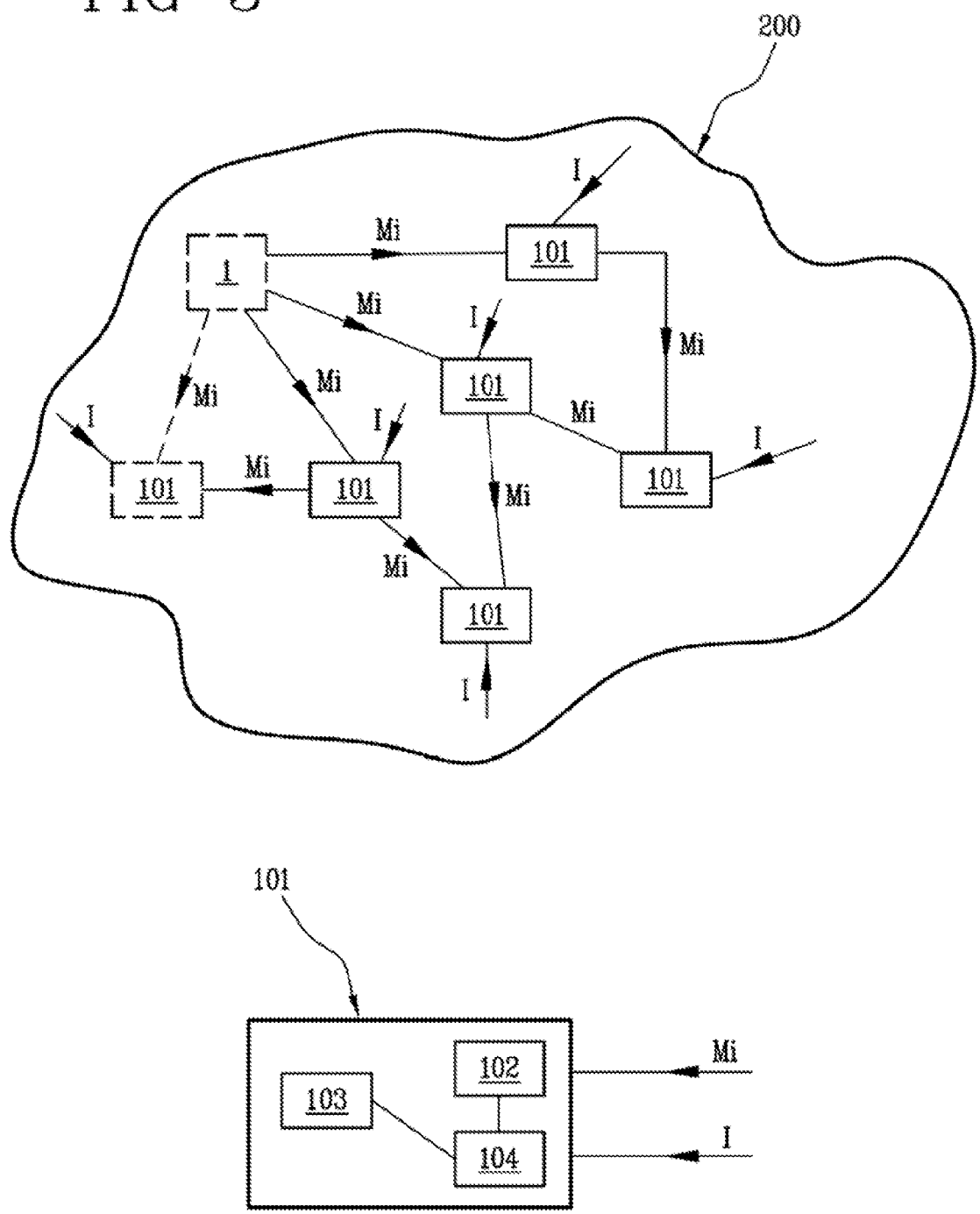

DEVICE FOR TRACKING PREDETERMINED OBJECTS IN A VIDEO STREAM FOR IMPROVING A SELECTION OF THE PREDETERMINED OBJECTS

FIELD OF THE INVENTION

The present invention relates to a device for tracking objects in a video stream. In particular, although not exclusively, the objects can be represented by buyable and/or selectable goods from a web site for example, and the video stream can be that shown on a computer. During the present specification reference will be made to these particular instances for clearness of exposition.

KNOWN ART

It is well known that the web makes available many e_commerce sites. Likewise, many other sites allow browsing between objects of interest enabling selection thereof so as to evaluate the particular features of same.

Usually, a user carries out browsing between objects of interest utilizing search engines. These engines presently represent the main way for identifying the contents of interest for the user.

A consumer user who is willing to acquire or examine a product/object on a web site has the possibility of selecting this product from a list or through a corresponding photo, or an icon representative of the object.

For buying it, the consumer user utilizes known equipment of electronic commerce technologies.

The selectable objects are represented in a static manner, often taken out of the environment in which they can be or are used.

Referring particularly to objects such as garments, the impossibility of showing the garment effect when worn and how it should be worn, as well as the environment for which it is best suited, often represents a deterrent rather than an encouragement to buying it. Generally, the selection of objects available on the web is linked to a presentation of same that is necessarily static and stiff inevitably neglecting part of the graphic, technical and functional features of said objects, causing a drop in the consumer's interest.

In this context, the technical task underlying the present invention is to propose a device for tracking objects in a video stream capable of overcoming the drawbacks of the above mentioned known art.

Specifically, it is an object of the present invention to provide a device for tracking objects in a video stream capable of improving process of selection of the same objects.

Another aim of the invention is to enable a selection of objects that are dynamically represented.

It is a further aim to enable a specific display of the functional qualities and/or features of the represented objects.

SUMMARY OF THE INVENTION

The technical task mentioned and the aims specified are substantially achieved by a device for tracking objects in a video stream, comprising the technical features set out in one or more of the appended claims.

The invention offers the following advantages:
- simplified selection of the object;
- consequent simplification in buying the selected object;
- better display of the object's features;
- greater promotional effect on the consumer.

Further features and advantages of the present invention will be better clarified by the description given by way of non-limiting example of a preferred but not exclusive embodiment of a device for tracking objects in a video stream as shown in the accompanying drawings.

BRIEF DESCRIPTION OF THE DRAWINGS

FIG. 3 shows a block diagram of a transmission system comprising the device of the invention.

DETAILED DESCRIPTION

A device for tracking objects in a video stream comprises a processing unit that in turn includes a plurality of modules configured for converting the incoming simple video stream into an outgoing video stream containing information on the shown objects. Preferably, this information is meta-information in the video stream, the term meta-information indicating not only tags but also an assembly of tags with other information added thereto.

Figure 1:
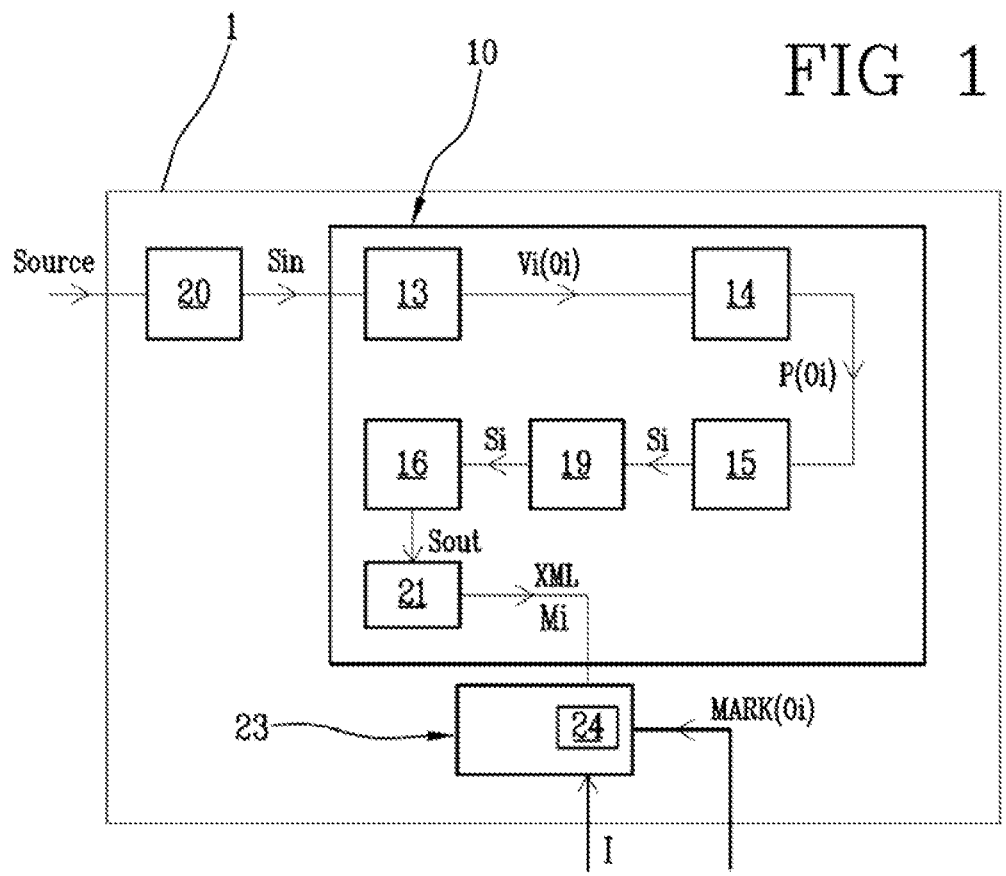
FIG. 1 is a block diagram of the device of the invention.
Figure 2:
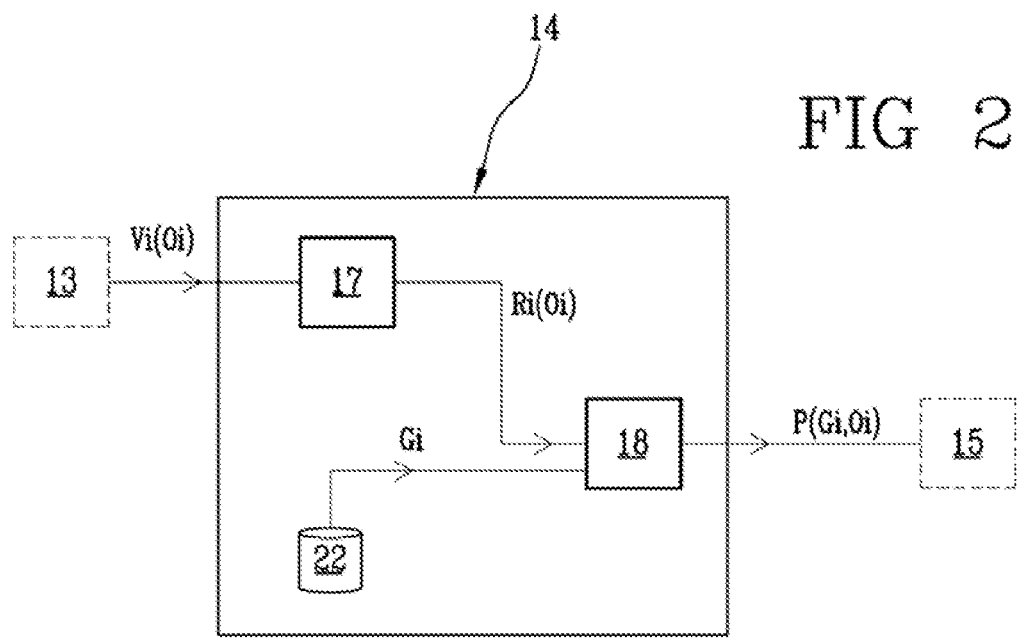
FIG. 2 is a detail of one block of the diagram shown in FIG. 1.

In particular, with reference to FIG. 1, a device 1 for tracking objects in a video stream $S_{IN}$ is shown. Preferably, the device 1 comprises a conversion module 20 configured for converting a Source video stream into the video stream $S_{IN}$.

In other words, the conversion module 20 converts a Source stream into a format of the video stream $S_{IN}$ as required for subsequent processing.

The objects will be denoted in the specification by the identifying letters "Oi", which will represent the i-th object in an assembly of n objects shown in the video stream $S_{IN}$.

Preferably, the video stream $S_{IN}$ is a fashion film and the objects Oi comprise garments shown for advertising purposes in this film.

Alternatively or in addition, the video stream $S_{IN}$ can be a film in which objects of various kinds are shown, such as a car, a building or a tree, for example. Alternatively or in addition, the object can be a reference to a service; for instance in a video a reference object to a hair-dresser, a bookshop, a shop or other can appear on a building.

Generally, the video stream $S_{IN}$ can be a film in which the objects are merely shown as part of an environment without any reference to the possibility of buying them.

Generally, the objects Oi can be any selectable or saleable product.

Preferably, device 1 comprises a processing unit 10. Generally it should be noted that in the present context and the following claims, the tracking device 1 will be shown as divided into distinct storage modules and operating modules for the only purpose of describing the device's functional operations in a clear and full manner.

These operations can be performed by a single electronic device suitably programmed and the different modules can correspond to hardware components and/or software routines being part of the programmed device. Alternatively or in addition, these operations can be performed by a plurality of electronic devices among which the modules can be distributed.

In addition, the involved devices can take advantage of one or more processors for execution of the instructions contained in the memory.

Further, the storage and operating modules can be locally or remotely distributed among different computers, based on the architecture of the network in which they are.

With reference to FIG. 1, the processing unit 10 in turn comprises a selection module 13 configured for selecting video portions V comprising sequences of a predetermined object Oi, from the video stream $S_{IN}$.

The composition of the video portions V relating to each individual object determines a video representing the object's life cycle from the appearing stage to the leaving stage.

According to the invention, the video stream can be that shown on a computer and/or a television, and/or a mobile apparatus such as a mobile phone or an iPad. Alternatively or in addition, the video stream can be shown on any other display means in which an interaction therewith is possible, through a mouse device, a touch screen or the like, for example.

In an embodiment of the invention, the video stream $S_{IN}$ is a fashion film.

The objects Oi, in the particular example are a shirt worn by a model for example, a scarf, a pair of shoes, a skirt, etc., the selection module 13 selecting portions of the film in which at least the selected shirt, or alternatively the skirt, or alternatively the scarf, etc. is present.

Alternatively, the video stream can also be a soap opera if it reproduces tagged objects, displayed by means of a decoder of a web-tv or an iptv operator, for example.

Preferably, the film must show objects to be advertised to a rather high concentration.

The processing unit 10 further comprises a tracking module 14 configured for tracking positions P of each predetermined object Oi in the selected video portions V.

In other words, the tracking module 14 determines the edges of each object Oi at each position P in the video portions V relating to the specific object Oi selected. Preferably, the positions of points P are defined by an operator.

Alternatively, a suitable program generates these positions.

The tracking module 14 comprises an interface 17 for setting references Ri representative of each predetermined object Oi in the video portions Vi.

In other words, through the interface 17 an operator sets reference points representative of an object Oi in a given position P, for instance points that, through interpolation, can represent a shirt, a skirt, etc.

An association module 18 included in the tracking module 14 is configured for associating predetermined polygonal shapes Gi with the object Oi in positions P, starting from references Ri.

Preferably, this association module 18 comprises a known linear approximation algorithm interpolating the reference Ri sequences and comparing them with the predetermined polygonal shapes Gi.

Preferably, a storage module 22 is associated with the association module 18 and comprises a library of predetermined polygonal shapes Gi.

In the preferred embodiment this library will comprise polygons representative of a shirt, a skirt, shoes, etc.

After the objects Oi have been tracked in positions P, partial video streams are created for each individual object represented.

To this aim, the processing unit 10 comprises a module 15 for creating object's video streams configured for creation of partial video streams $S_i$ as a function of the tracked positions P.

Each partial video stream $S_i$ represents an object Oi tracked in positions P.

A first display module 19 configured for showing the partial video streams $S_i$ enables an operator to verify the quality of the created video stream $S_i$.

Should the operator deem the quality unsatisfactory, new positions P are defined for the object, interpolation is carried out again and a new partial video stream $S_i$ is created.

According to the invention, once the partial video streams $S_i$ are created, they are composed again into a single video stream.

To this aim, the device 1 comprises a composition module 16 configured for composing the partial video streams $S_i$ of the individual objects Oi into an output video stream $S_{OUT}$.

In other words, the output video stream $S_{OUT}$ comprises the partial video streams $S_i$, tracked with the positions P passed through by each object Oi from the moment it appears in the video stream to the moment it leaves the video stream.

Device 1 comprises a conversion module 21 configured for converting the output video stream $S_{an}$ into meta-information.

Preferably, this meta-information comprises meta-data in the required format for the web.

Preferably, the requested format is XML.

A user interface 23 of this device 1 is configured for showing the output video stream $S_{OUT}$ depending on a request mark signal for tracking objects Oi.

In other words, the user interface 23 allows the consumer through the mark signal, to select whether to see or not the video stream $S_{OUT}$ with the tracked objects.

The user interface 23 further comprises a second display module 24 configured for showing features of the objects Oi depending on an input signal I.

Signal I is representative of a particular choice regarding displaying and/or features and/or additional functions of said objects Oi.

In the preferred embodiments, signal I is representative of one of the choices of displaying:
information on the product;
information on the brand;
correlated products;
addition to a wish list.

Generally, signal I is representative of many different effects of man/video interaction.

Operation of the device according to the invention can be inferred from the above description.

During reproduction of a video stream, the user selects the objects of interest for displaying the object's features and/or the features of the service connected therewith for possible purchase.

In a preferred embodiment of the invention, the device 1 for tracking objects Oi in a video stream $S_{IN}$ operates in a transmission network 200 in which the created meta-information Mi is transmitted.

Device 1 can operate in a local area network (LAN), wide area network (WAN) or space network (WEB).

Preferably, the transmission sphere is the world wide web and the used protocol is the TCP/IP (the Internet protocol).

In other words, the invention relates to a meta-information Mi transmission system in a transmission network 200.

The transmission system 200 comprises at least one device 1 for tracking objects Oi in a video stream $S_{IN}$, as previously described.

The processing unit 10 of device 1 comprises:
a selection module 13 configured for selecting video portions V comprising sequences of a predetermined object Oi, from the video stream $S_{IN}$;
a module 14 for tracking positions P of the predetermined object Oi in the video portions V;
a module 15 for creating object's video streams, configured for creation of partial video streams $S_i$ as a function of the tracked positions P, in which each partial video stream $S_i$ represents one tracked object Oi;

a composition module 16 configured for composing the partial video streams $S_i$ of said individual objects Oi into an output video stream $S_{OUT}$.

a conversion module 21 configured for converting said output video stream $S_{OUT}$ into meta-information Mi.

According to the invention, the meta-information Mi transmission system further comprises at least one destination device 101 configured for receiving the meta-information Mi.

In other words, object Oi tracked by the tracking device 1 becomes "taggable", i.e. it can be extrapolated from the video stream in which it is shown.

Preferably, the meta-information comprises meta-data (meta-tags) in the format required for the web.

The meta-tags contained in the meta-information Mi can be transferred from the tracking device 1 to the destination device 101.

According to the invention, the destination device 101 comprises an interface 103 configured for showing the meta-information Mi.

The destination device 101 further comprises a memory 102 and a processing unit 104 for the instructions contained in such a memory.

The interface 103 is configured for receiving an input signal I representative of a particular choice regarding displaying and/or features and/or additional functions of the objects Oi having determined the meta-information Mi.

In other words, the interface 103 is configured for showing the meta-information Mi as a function of an input signal I representative of a particular choice regarding displaying and/or features and/or additional functions of the objects Oi having determined the meta-information Mi.

As already said, signal I is representative of one of the displaying choices of:
information on the product;
information on the brand;
correlated products;
addition to a wish list.

Generally, signal I is representative of many different effects of man/video interaction.

According to the invention the destination device 101 is configured for in turn operating as a transmitter of the received meta-information Mi, to other destination devices 121.

In other words, distribution of the objects in the network is similar to that of youtube and flickr; the user can take the meta-information of the object and insert it in another site or blog, thus generating that which is described as viral contents.

Advantageously, according to the invention, it is the user himself/herself that directly promotes communication and sale of the object he/she has selected.

In addition, the invention promotes definition of the users' profile; in fact, the wish-list provides data on the user's tastes/interests.

Advantageously, according to the invention, it is possible to analyze the user's choices in a very detailed manner based on the statistics of user/contents interaction, for each object and each view.

Since each user shares his/her experience, tastes, interests, etc., with other people, he/she becomes a member of the system of the invention.

In other words, a personal wish list becomes a promotional channel to the social networks, for promoting goods/services of interest of the user. Furthermore, distribution by the users of the selected objects enables definition of a distributed e_commerce created by the users themselves.

In other words, the users, by selecting the object and for instance placing the code (meta-information) in their blog, enable the meta information to go round in the net; the meta-information tag remains active and causes the purchase functions to be opened again, thus bringing back the users from a generic location on the web to the purchase site; the link is transmitted from user to user and it is no longer necessary to known the origin site from which the interactive video, i.e. the meta-information comes.

As those skilled in the art will readily understand from the above description, the users' posts are identified in the invention with the destination device 101, while the site from which the meta-information comes is identified in the invention with the tracking device 1.

With the system of the invention, the information distribution on the net is also valid for the information not concerning commerce.

Therefore users can help in spreading cultural news and information, promoting a brand or an object the user likes, etc.

According to the invention the device 1 for tracking objects is associated with an operating environment configured for maintaining a trace of the tracking carried out on the video stream $S_{IN}$.

In other words, the operating environment is configured for showing the list of the tracked objects and enabling direct browsing from the list to the positions in the video stream $S_{IN}$ in which the object Oi is shown.

Preferably, the destination device 101 comprises a web server.

Preferably, the destination device 101 comprises a personal computer.

Preferably, the destination device 101 comprises a television set.

Preferably, the destination device 101 comprises a notebook computer.

Preferably, the destination device 101 comprises a mobile phone.

In other words, the destination device 101 comprises one or more of a web server, personal computer, TV, notebook, mobile phone or the like.

What is claimed is:

1. A device for tracking objects in a video stream, said device comprising one or more processors configured for:
    selecting video portions, comprising sequences of a predetermined object, from said video stream;
    tracking positions of said predetermined object in said video portions;
    creating video streams of predetermined objects, the one or more processors configured for creation of partial video streams as a function of tracked positions obtained from tracking positions of said predetermined objects, each said partial video stream representing one tracked predetermined object;
    composing said partial video streams of individual said tracked predetermined objects into an output video stream;
    wherein said tracking comprises:
        setting reference points representative of each said predetermined object in said tracked position; and
        associating predetermined polygonal shapes with said predetermined object in said tracked positions, starting from said reference points; and
        the associating predetermined polygonal shapes with said predetermined objects in said tracked positions comprises a linear approximation algorithm interpolating a reference sequence and comparing the reference sequence with said predetermined polygonal shapes.

2. The device for tracking objects as claimed in claim 1, the one or more processors being further configured for converting said output video stream into meta-information.

3. The device for tracking objects as claimed in claim 2, wherein said meta-information comprises meta-data in a format as required for the web, and wherein said meta-data comprises meta-tags.

4. The device for tracking objects as claimed in claim 1, further comprising a user interface configured for showing said output video stream as a function of a request mark signal for tracking said objects.

5. The device for tracking objects as claimed in claim 4, wherein said user interface comprises a second display configured for showing features of said objects as a function of an input signal representative of a particular choice regarding displaying and/or features and/or additional functions of said objects.

6. The device for tracking objects as claimed in claim 1, further comprising a storage element comprising a library of said predetermined polygonal shapes.

7. The device for tracking objects as claimed in claim 1, further comprising a first display module configured for displaying said partial video streams.

8. The device for tracking objects as claimed in claim 1, wherein the one or more processors are configured for converting a one source video stream into said output video stream.

9. A meta-information transmission system in a transmission network, comprising:
   i) at least one tracking device for tracking objects in a video stream, said at least one device including one or more processors configured for:
      selecting video portions comprising sequences of a predetermined object, from said video stream;
      tracking positions of said predetermined object in said video portions;
      creating video streams of predetermined objects, the one or more processors configured for creation of partial video streams as a function of tracked positions obtained tracking positions of said predetermined objects, each said partial video stream representing one tracked predetermined object;
      composing said partial video streams of individual predetermined objects into an output video stream;
      converting said output video stream into meta-information; and
   ii) at least one destination device configured for receiving said meta-information,
      wherein said tracking comprises:
         setting reference points representative of each said predetermined object in said tracked positions; and
         associating predetermined polygonal shapes with said predetermined object in said tracked positions, starting from said reference points; and
      the associating predetermined polygonal shapes with said predetermined objects in said tracked positions comprises a linear approximation algorithm interpolating a reference sequence and comparing the reference sequence with said predetermined polygonal shapes.

10. The transmission system as claimed in claim 9, wherein said at least one destination device comprises a user interface configured for showing said meta-information as a function of an input signal representative of a particular choice regarding displaying features and/or additional functions of said objects having determined said meta-information.

11. The transmission system as claimed in claim 10, wherein said at least one destination device is configured for in turn operating as a transmitter of said meta-information received from said tracking device, to other destination devices.

12. The transmission system as claimed in claim 11, wherein said meta-information comprises meta-data in a required format for the web, and wherein said meta-data comprises meta-tags.

13. The transmission system as claimed in claim 9, wherein said at least one destination device comprises one or more of a web server, personal computer, TV, notebook, or mobile phone.

14. The device for tracking objects as claimed in claim 1, wherein the positions are defined by an operator.

15. The device for tracking objects as claimed in claim 14, wherein the tracking comprises setting further reference points, carrying out a further interpolation and creating a further partial video stream, in case the operator verifies that the quality of the created video is unsatisfactory.

16. The device for tracking objects as claimed in claim 1, wherein the tracking positions of said predetermined object in said video portions is performed by determining the edges of said predetermined object at each position in said video portions relating to the predetermined object.

* * * * *